United States Patent [19]

Seerieder et al.

[11] Patent Number: 4,806,719
[45] Date of Patent: Feb. 21, 1989

[54] METHOD AND DEVICE FOR MONITORING A SPARK-ERODING PROCESS IN A SPARK-ERODING MACHINE

[75] Inventors: Karl Seerieder, Groebenzell; Eckhard Wellner, Reisbach, both of Fed. Rep. of Germany

[73] Assignee: Friedrich Deckel Aktiengellschaft, Munich, Fed. Rep. of Germany

[21] Appl. No.: 68,449

[22] Filed: Aug. 30, 1987

[30] Foreign Application Priority Data

Jul. 4, 1986 [DE] Fed. Rep. of Germany ....... 3622520

[51] Int. Cl.$^4$ .............................................. B23H 7/20
[52] U.S. Cl. ................................ 219/69 C; 204/129.2; 204/224 M; 219/69 M; 219/69 P
[58] Field of Search ................. 219/69 C, 69 G, 69 P, 219/69 S, 69 M; 204/129.2, 129.25, 129.5, 224 M

[56] References Cited

U.S. PATENT DOCUMENTS

| | | |
|---|---|---|
| 3,812,317 | 5/1974 | De Bont et al. ................... 219/69 C |
| 3,816,692 | 6/1974 | Ratmansky ......................... 219/69 C |
| 3,857,011 | 9/1973 | Saito et al. ......................... 219/69 C |
| 4,504,722 | 3/1985 | Kishi et al. ......................... 219/69 C |
| 4,695,696 | 9/1987 | Ozaki et al. ....................... 219/69 C |
| 4,700,038 | 10/1987 | Dauw ................................. 219/69 C |

FOREIGN PATENT DOCUMENTS

| | | |
|---|---|---|
| 2314801 | 1/1977 | France ............................... 219/69 C |
| 55-48531 | 4/1980 | Japan ................................. 219/69 C |
| 168833 | 10/1982 | Japan ................................. 219/69 C |
| 156618 | 9/1984 | Japan ................................. 219/69 C |
| 61-44530 | 3/1986 | Japan ................................. 219/69 C |

OTHER PUBLICATIONS

Weck, "Aufbau des Gesamtregelsystems und Auslegung der Teilkreise", Report No. 175-5/80, Lehrstuhl fuer Werkzeugmaschinen at the TH Aachen, Mar. 19, 1981.

Primary Examiner—A. D. Pellinen
Assistant Examiner—Geoffrey S. Evans
Attorney, Agent, or Firm—Flynn, Thiel, Boutell & Tanis

[57] ABSTRACT

A method and device for monitoring a spark-eroding process in a spark-eroding machine, in which the impulse voltage curve is measured in the working gap and, when the actual voltage curve differs from a desired voltage curve, a control command is produced which changes the process data of the eroding machine. The voltage impulses are thereby, depending on the occurring ignition delay unit ($t_d$), associated with different impulse groups which are each characterized by a pregiven ignition delay range. The impulses occurring in each impulse group are counted and a control command is produced when a pregiven limit number of successive impulses of one impulse group is exceeded indicating a process degeneration. The control command changes the process data of the eroding machine in the sense of a normalization of the process.

18 Claims, 1 Drawing Sheet

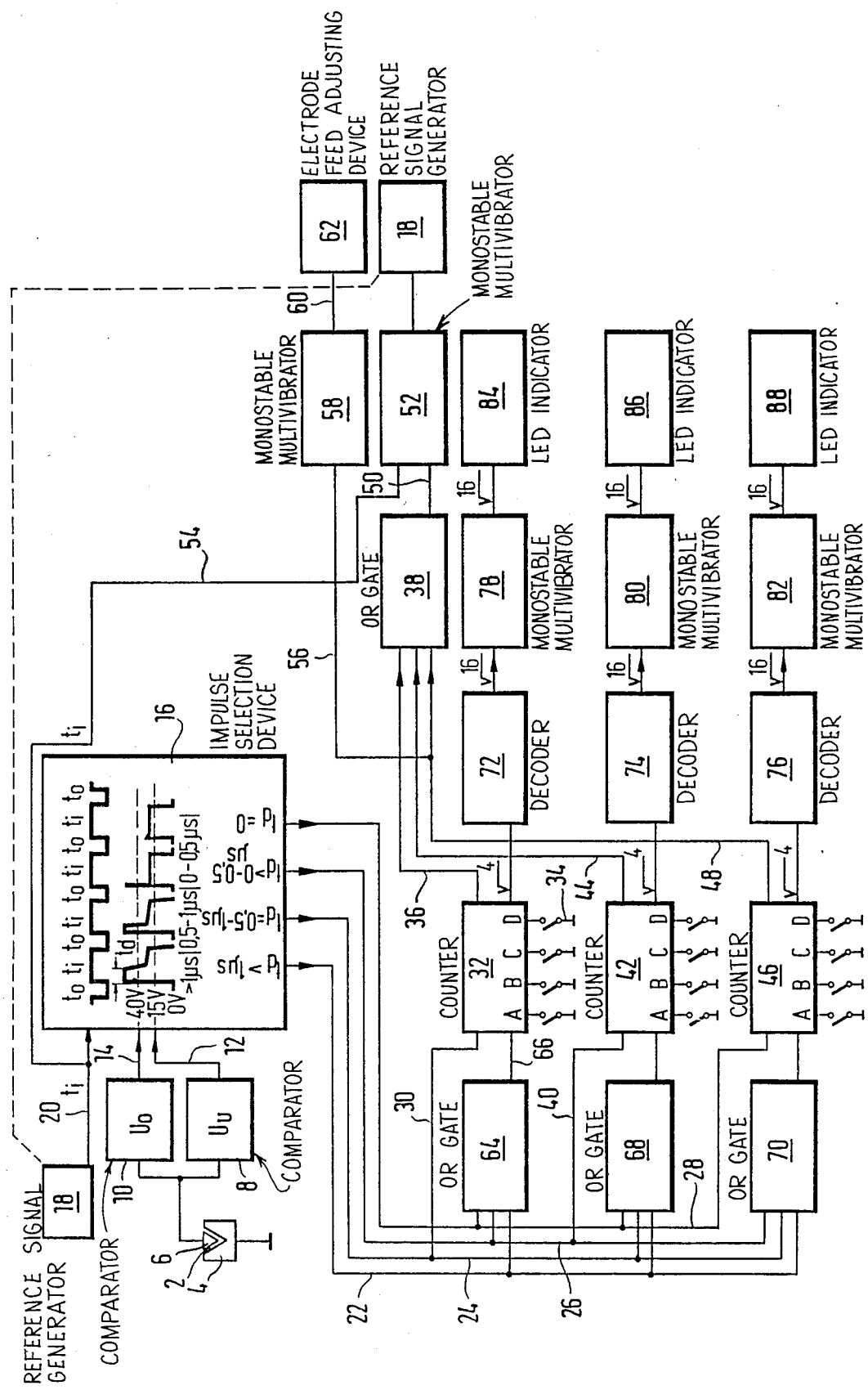

METHOD AND DEVICE FOR MONITORING A SPARK-ERODING PROCESS IN A SPARK-ERODING MACHINE

FIELD OF THE INVENTION

The invention relates to a method and a device for monitoring a spark-eroding process in a spark-eroding machine, whereby the impulse voltage curve is measured in the working gap and, when the actual voltage curve differs from a desired voltage curve, a control command is produced, which changes the process data of the eroding machine.

BACKGROUND OF THE INVENTION

Voltage impulses occur in the eroding gap during the spark-eroding process, which impulses have a characteristic curve shape, namely the voltage generally increases first steeply to a voltage lying above the working voltage whereat the spark path is ionized, and drops to the actual working voltage after a specific ignition delay time, which substantially exists until the end of the impulse duration and drops then again to zero. The shape of the voltage impulses determines whether the impulse is usable or is in any way degenerated.

It is already generally known to measure, for example, the ignition voltage or the working voltage and the ignition delay time and to produce a control command when the measured values differ from the pregiven desired values, which control command controls the process data of the spark-eroding machine in such a manner that the cause for the deviations is eliminated.

However, it has been found, that during a normal process without interference, the ignition time delay does not constantly correspond with a specific, ideal desired value, but varies constantly due to the constantly changing gap conditions (Report No. 175-5/80, Lehrstuhl fuer Werkzeugmaschinen at the TH Aachen). A given desired value for the ignition delay time has then the result that during the normal process course, due to the constant deviations from the desired value, the electronic control constantly interferes with the process, which decisively worsens the efficiency of the process. The ignition delay time is, therefore, considered to be not suited as a process-controlling factor.

The purpose of the invention is to provide a method and a device for carrying out the method, which permits a use of the ignition delay time for controlling the process.

The invention utilizes the knowledge that in an interference-free eroding process never more than one specific number, for example three to five impulses of the same group are produced one after the other. Only when a tendency for process degeneration exists does the number of impulses of one group increase. The impulses are, according to the invention, sorted with respect to their ignition delay time or are associated with specific groups and are counted. If more than one pregiven limit number of impulses occurs one after the other in one group, then a control command is produced which changes the process data of the eroding machine in the sense of a normalization of the process. The groups are divided according to various aspects. A division which is too rough results in a process degeneration not being recognized or being recognized too late. A division which is too fine may possibly result in the system being too sensitive and most of all increases the technical requirements and thus the expense of the machine.

The invention provides that several impulse groups, with joining ignition delay ranges covering all together the entire possible ignition delay range, are formed so that a first impulse group covers an ignition delay range corresponding with or being larger than a normal impulse, a last impulse group covers a disappearing ignition delay range, and several impulse groups lying therebetween covers impulse delay ranges each lying therebetween. The control commands caused by the various impulse groups can basically be similar; however, there also exists the possibility to associate with the different impulse groups different control commands, since for example primarily the first impulse group and the last impulse group each indicate different tendencies of a process change.

Successive impulses of different impulse groups are inventively added up in a respectively associated counter, until either the limit number of impulses releasing the control command has been reached or the impulse sequence is interrupted by the occurrence of an impulse of another group. The counter is in the first case reset after giving the control command, in the second case directly again to an initial value.

The invention provides that the control commands each effect an interruption of the supply of voltage impulses to the working gap. This so called current-interruption strategy is generally sufficient to prevent a process degeneration. A development of the invention provides the control commands released upon reaching the limit number of impulses of the last impulse group effect a lifting off of the working electrode from the workpiece. The last impulse group with a disappearing ignition delay range is particularly critical and shows the tendency to form an arc, which is dealt with by the so called lifting strategy. By lifting off the electrode, the eroding process is, in a conventional manner, interrupted for a longer period of time and a flushing of dielectric is reinforced.

In a further development of the invention, the impulses of the first impulse group are not counted, and an exceeding of a limit number of impulses of this group remains without consideration. The first impulse group is characterized in having an ignition delay range corresponding with a normal impulse or being greater than a normal impulse. The impulses are not critical with respect to the quality of the machining task also when the ignition delay is greater compared with the normal impulse, at most the efficiency, not, however, the quality of the machining is affected.

The ignition delay time is measured inventively in such a manner that, with a rising edge and with a dropping edge of each impulse, the interval is fixed through a lower threshold value for the voltage and an upper threshold value for the voltage. The lower threshold value represents a minimum voltage for the working voltage, the upper threshold value a minimum voltage for the ignition voltage. It can be determined, on the one hand, from these intervals whether a working impulse has taken place, on the other hand, whether an ignition voltage has been reached and how great the ignition delay time is.

An impulse selection device with several outputs, each corresponding with one impulse group, is connected to the working gap of the eroding machine. The outputs each emit one counting impulse upon occurrence of an impulse of an associated impulse group. The counting impulses are each fed to counting devices which are connected after the impulse-selection device. The counting devices emit, upon reaching the limit number of impulses, a carry over signal, which are transformed into a control command for controlling the eroding machine in control devices inserted after the counting devices. The impulse selection is done by an evaluation of the voltage time intervals through the aforementioned threshold values. The time intervals are determined by a comparator defining a lower threshold value for the impulse voltage and a comparator defining the upper threshold value for the impulse voltage, which are connected before the impulse selection device.

The counting devices each inventively include a binary counter which can be reset and is connected to an output of the impulse-selection device to which, through an OR-gate, are fed the signals applied at the other outputs of the selection device as preset signals. The binary counter adds the signals coming from the selection device until either the limit number is reached, or until it is reset, through an impulse signal of another impulse group, to its initial value, as will be described in greater detail below.

One common timing circuit is connected after all counting devices, which timing circuit interrupts, with a carry over signal starting out from the counting devices, for a specific time the supply of impulses to the working gap. A synchronizing signal additionally fed to the timing circuit and coming from the eroding generator causes a cutoff command to extend to full operating impulses. Thus operating impulses which are too short and can effect increased electrode wear are avoided.

An additional timing circuit is preferably connected after the counting device associated with the fourth impulse group and is used to control the feed drive of the electrode in the sense of a quick gap enlargement.

In a further development of the invention, analogous luminous-band indicators for indicating the respectively successively counted impulses of each impulse group are connected to the counting devices. The luminous-band indicator makes optically visible the maximum addition of impulses of the same group and thus the tendency toward process degeneration.

BRIEF DESCRIPTION OF THE DRAWING

One exemplary embodiment of the inventive device is illustrated in the drawing and will be described in detail hereinafter. The drawing shows schematically a circuit diagram of a monitoring device, in which four impulse groups are formed.

DETAILED DESCRIPTION

The impulse voltage applied at a working gap 2 between a workpiece 4 and an electrode 6 is fed to two parallel-connected comparators 8, 10. The comparator 8 defines a lower threshold value $U_u$ and emits a signal when the impulse voltage moves through the lower threshold value. The comparator 10 defines an upper threshold value $U_o$ for the impulse voltage and emits a signal when the impulse voltage moves through the upper threshold value. The lower threshold value is, for example, 15 volts, the upper threshold value 40 volts. The signals of the comparators 8 or 10 are fed through lines 12 or 14 to the impulse-selection device 16. Furthermore, a reference signal $t_i$ coming from the generator interface 18, and timed in the rhythm of the operating impulse sequence, is fed through the line 20 to the impulse-selection device 16.

Four impulse groups are formed in the impulse-selection device 16. A first impulse group receives the impulses having an ignition delay time $t_d$ which is greater than 1 μs; the impulses with $t_d = 0.5$ to 1 μs are combined in the second impulse group, the impulses with $t_d$ greater than 0 to 0.5 μs are combined in the third impulse group, and the impulses with $t_d = 0$ are combined in the fourth impulse group. Each impulse of the first impulse group produces a counting signal in the associated line 22 which starts out from the impulse-selection device 16, the impulses of the other impulse groups produce each counting signals in the lines 24, 26 and 28 associated with them.

The counting impulses of the line 22 are not counted, since they do not influence the operating quality and thus do not necessarily give a reason to interfere in the process. The counting impulses of the line 24 are fed through the line 30 to a 4-bit-binary counter 32. The counter 32 delivers, starting out from an initial number voluntarily adjustable through a present switch 34 upon reaching the count number 16, a carry over signal which is fed through the line 36 to an OR-gate 38. The counting impulses of the line 26 are fed through a line 40 to a 4-bit-binary counter 42, the carry over signal starting out from there are fed through the line 44 also to the OR-gate 38. The counting impulses of the line 28 are counted in the same above-described manner in a 4-bit binary counter 46, and the carry over signal is fed through a line 48 also to the OR-gate 38.

During the occurrence of a carry over signal in one of the lines 36, 44 or 48, the OR-gate 38 produces a trigger impulse which is fed through the line 50 to a monostable multivibrator circuit 52. The trigger impulse thus produces a control signal, when a specific limit number of impulses occurs successively in the second, third or fourth impulse group. The control signal results in an interruption of the supply of operating impulses to the working gap for a specific interval of time.

Furthermore, the reference signal $t_i$ coming from the generator interface 18 is fed through a line 54 to the multivibrator circuit 52. The reference signal $t_i$ makes sure that the interruption in the supply of operating impulses to the working gap cannot occur during the signal time $t_i$, since shortened operating impulses may result in an increased wear of the electrode.

The drawing shows that the carry over signal of the binary counter 46 is furthermore fed through a line 56 to a monostable multivibrator circuit 58 which, through a line 60, emits a control signal to a device 62 for adjusting the feed of the electrode. Upon occurrence of a signal in the line 60, the electrode is, for example for the purpose of a quick enlarging of the gap, pulled back and thereafter again moved into the operating position.

An OR-gate 64 is connected to a further input terminal to the binary counter 32 controlled through the line 24, which OR-gate is connected to the other lines 22, 26 and 28. Each of the counting impulses occurring in these other lines produces a preset signal in the line 66, which preset signal resets the binary counter 32 to an initial number. Thus while every counting impulse occurring in the line 24 advancingly steps the binary counter 32 for one count, every counting impulse occurring in the lines 22, 26, 28 resets the binary counter 32 to its preset initial number. The OR-gates 68, 70 associated with the binary counters 42 and 46 correspond with the OR-gate 64. The OR-gates 68, 70 accordingly reset, upon occurrence of counting impulses in the signals not to be counted by the associated binary counters, the binary counters to their initial number.

OPERATION

The device functions as follows: All operating impulses applied at the working gap 2 are, in the impulse-selection device 16, associated with one of the four impulse groups. The impulses of the second, third and fourth impulse groups, occurring one after the other, are added up in the binary counters 32, 42 and 46, until they either reach a specific limit number or until the binary counter through the occurrence of an impulse of another group is again reset to its initial number. The carry over signals of the binary counters 32, 42 and 46 act through the OR-gate 38 and the multivibrator circuit 52 equally onto the generator interface 18 connected to the flip-flop circuit 52 and results in the earlier described current-interruption strategy. Especially upon occurrence of a carry over signal in the line 48, a so called take-off or lifting strategy is additionally released for adjusting the feed through the multivibrator circuit 58 and the device 62.

In order to make the tendency toward a process degeneration noticeable, the results of a count of the binary counters 32, 42 and 46 are decoded in 16 of 4 decoders 72, 74 and 76 connected to the binary counters 32, 42 and 46, respectively, and the output signals are extended in monoflops triggerable thereafter and connected after the binary counters each with 16 monostable multivibrator circuits 78, 80 and 82 and are utilized to control LED-luminous-band indicators 84, 86 and 88 each with 16 LEDS. These each indicate how many operating impulses of the second, third or fourth group occur each one after the other, so that the maximum addition of impulses of the same group is visible on each luminous-band indicator.

The embodiments of the invention in which an exclusive property or privilege is claimed are defined as follows:

1. In a method for controlling a spark-eroding process in a spark-eroding machine, including the steps of measuring an impulse voltage curve of each voltage impulse applied across a working gap between a workpiece and electrode and, in response to a deviation of the measured voltage curve from a desired voltage curve, producing a control command which changes the spark-eroding process of the eroding machine, the improvement comprising wherein said step of measuring the impulse voltage curve includes the step of measuring an ignition delay time of the voltage impulse; including the steps of classifying the voltage impulses, depending on said ignition delay time associated with each, into different impulse groups each characterized by a respective pregiven ignition delay time range and each associated with a respective pregiven limit number, counting the voltage impulses classified successively into each said impulse group, and restarting the count associated with a respective said group in response to classification of one of said voltage impulses into a different said group; and carrying out said step of producing said control command in response to the classification into any one of said impulse groups of a number of successive voltage impulses equal to said pregiven limit number associated with such group.

2. The method according to claim 1, including the step of providing said impulse groups with respective adjoining ignition delay ranges together covering the entire possible ignition delay range, a first said impulse group covering an ignition delay larger than a normal impulse, a second said impulse group covering a very short ignition delay, and several said impulse groups covering ignition delay ranges each lying therebetween.

3. The method according to claim 1, including the steps of adding up successive voltage impulses of respective said impulse groups in respective counters, resetting the added-up number of voltage impulses in each said counter for a respective said impulse group upon occurrence of a voltage impulse in another said impulse group, and producing said control command when the added-up number of voltage impulses in one of said counters reaches said pregiven limit number for the impulse group associated with such counter.

4. The method according to claim 1, including the step of responding to each of said control commands by effecting an interruption of the supply of voltage impulses to the working gap.

5. The method according to claim 3, including the step of producing a further said control command when the added-up number of impulses in said counter for one said impulse group reaches said pregiven limit number for such counter, and the step of responding to said further control command by separating the electrode from the workpiece, said one impulse group corresponding to very short ignition delay times.

6. The method according to claim 1, wherein said step of measuring the ignition delay time of each measured voltage impulse includes the steps of monitoring the passing of the voltage impulse through a lower threshold value corresponding with a minimum voltage value for an effective operating impulse and through an upper threshold value corresponding with a maximum voltage value for an effective operating impulse, and measuring as said ignition delay time the interval between two respective points in time at which the voltage impulse passes through the upper threshold value provided an effective operating impulse then occurs.

7. A method for controlling a spark-eroding process in a spark-eroding machine, including the steps of: measuring an impulse voltage curve of each voltage impulse applied across a working gap between a workpiece and electrode and, in response to a deviation of the measured voltage curve from a desired voltage curve, producing a control command which changes the spark-eroding process of the eroding machine, wherein said step of measuring the impulse voltage curve includes the step of measuring an ignition delay time of the voltage impulse; classifying the voltage impulses, depending on said ignition delay time associated with each, into different impulse groups each characterized by a respective pregiven ignition delay time range, and counting the voltage impulses classified successively into each said impulse group; carrying out said step of producing said control command in response to the classification of a pregiven limit number of successive voltage impulses into one of said impulse groups; providing said impulse groups with respective adjoining ignition delay ranges together covering the entire possible ignition delay range, a first said impulse group covering an ignition delay larger than a normal impulse, a second said impulse group covering a very short ignition delay, and several said impulse groups covering ignition delay ranges each lying therebetween; and, for each said impulse group other than said first impulse group, adding up successive impulses of the group and producing said control command in response to the occurrence of said pregiven limit number of successive impulses in the group.

8. In a device for controlling a spark-eroding process in a spark-eroding machine, including means for measuring an impulse voltage curve of each voltage impulse applied across a working gap between a workpiece and electrode and, in response to a deviation of the measured voltage curve from a desired voltage curve, producing a control command which changes the spark-eroding process of the eroding machine, the improvement comprising wherein said means for measuring includes: an impulse selection device responsive to the impulse voltage curves from the working gap of the eroding machine and having several outputs which each correspond to one of a plurality of impulse groups, said selection device classifying each said impulse voltage curve into a respective said impulse group and then producing on said output associated with such group a counting impulse; a plurality of counters which each have a count input connected to a respective one of said outputs of said impulse selection device and which each emit a control command impulse upon counting a pregiven limit number of successive counting impulses from such output, each said counter including means for resetting it in response to the occurrence of a counting impulse on one of said outputs of said selection device other than the output connected to the count input of such counter; and a device which is connected to said counters and produces said control command for controlling the spark-eroding machine in response to each said control command impulse.

9. The device according to claim 8, wherein said selection device includes a first comparator which compares a lower threshold value to the measured voltage impulse, a second comparator which compares an upper threshold value to the measured voltage impulse, said selection means responsive to each of said comparators for recognizing effective operating impulse voltage curves, for measuring an ignition delay time of each said voltage curve, for effecting said classification of said voltage curves as a function of said delay times, and for producing said counting impulses.

10. The device according to claim 8, wherein said counters each include one resettable binary counter having a count input connected to a respective said output of said impulse selection device and having a preset control input connected to an output of a respective OR-gate, the other outputs of the selection device each being connected to a respective input of such OR-gate.

11. The device according to claim 8, wherein said counters each have a carry output, and wherein said device which produces said control commands includes an OR-gate having inputs which are each connected to said carry output of a respective said counter, and includes a timing circuit which is connected to an output of said OR-gate and which causes an interruption of predetermined duration in the voltage impulses applied across the working gap in response to a signal from said OR-gate to thereby effect said change in said spark-eroding process.

12. The device according to claim 11, wherein a synchronizing signal from an eroding generator is fed to said timing circuit, said synchronizing signal causing said timing circuit to initiate said interruption at a point in time between two successive voltage impulses at the working gap.

13. The device according to claim 8, including a timing circuit which is connected to a carry output of one said counter and which effects a separation of the electrode from the workpiece so as to increase the working gap in response to a signal at said carry output of said one counter.

14. The device according to claim 8, including a plurality of luminous-band indicators which are each connected to a respective said counter and which each display the respective count of impulses present in such counter.

15. A method for controlling a spark-eroding process in a machine having an electrode and a workpiece separated by a machining gap, including the steps of: applying between said workpiece and said electrode a series of successive voltage pulses; measuring a delay time from the start of each said pulse until the voltage value thereof stabilizes at a voltage which effects ionization in said gap; classifying each said voltage pulse as a function of said delay time thereof into a respective one of a plurality of groups, said groups corresponding to respective mutually exclusive delay time ranges; maintaining a count of said voltage pulses successively classified into one of said groups; resetting said count in response to classification of one of said voltage pulses into any said group other than said one group; and effecting a change in said spark eroding process in response to said count reaching a predetermined value.

16. The method of claim 15, including the step of maintaining a respective count for each said group other than a selected one of said groups, and associating with each said group other than said selected group a respective said predetermined value, and effecting said change in said spark eroding process when any said count reaches the associated predetermined value.

17. The method of claim 16, wherein said step of effecting a change in said spark eroding process is carried out by performing the step of interrupting the application of a plurality of said voltage pulses between said workpiece and electrode.

18. The method according to claim 16, including the step of moving said electrode and workpiece away from each other and then toward each other when said count associated with one of said groups other than said selected group reaches said predetermined value associated therewith.

* * * * *

UNITED STATES PATENT AND TRADEMARK OFFICE
CERTIFICATE OF CORRECTION

PATENT NO. : 4 806 719

DATED : February 21, 1989

INVENTOR(S) : Karl SEERIEDER et al

It is certified that error appears in the above-identified patent and that said Letters Patent is hereby corrected as shown below:

On the title page, change the filing date from "August 30, 1987" to ---June 30, 1987---.

On the title page, change the Assignee from "Friedrich Deckel Aktiengellschaft" to ---Friedrich Deckel Aktiengesellschaft---.

Column 7, line 37; change "said" to ---and---.

Signed and Sealed this

Tenth Day of October, 1989

Attest:

DONALD J. QUIGG

Attesting Officer

Commissioner of Patents and Trademarks